(12) United States Patent
Shirai

(10) Patent No.: US 6,845,993 B2
(45) Date of Patent: Jan. 25, 2005

(54) RACK AND PINION STEERING APPARATUS AND METHOD FOR PRODUCING THE SAME

(75) Inventor: Takayuki Shirai, Kanagawa-ken (JP)

(73) Assignee: Unisia JKC Steering Systems Co., Ltd., Atsugi (JP)

( * ) Notice: Subject to any disclaimer, the term of this patent is extended or adjusted under 35 U.S.C. 154(b) by 54 days.

(21) Appl. No.: 10/321,795

(22) Filed: Dec. 18, 2002

(65) Prior Publication Data

US 2003/0141690 A1 Jul. 31, 2003

(30) Foreign Application Priority Data

Dec. 19, 2001 (JP) .......................................... 2001-385659

(51) Int. Cl.⁷ .............................................. B62D 3/12
(52) U.S. Cl. ................... 280/93.514; 180/428; 74/380; 74/422
(58) Field of Search .................. 180/428; 280/93.514; 74/422, 380

(56) References Cited

U.S. PATENT DOCUMENTS

| | | | | |
|---|---|---|---|---|
| 3,680,443 A | * | 8/1972 | Jenvey | 91/375 A |
| 4,063,490 A | * | 12/1977 | Duffy | 91/467 |
| 4,709,593 A | * | 12/1987 | Takeuchi | 74/498 |
| 5,082,077 A | * | 1/1992 | Holka | 180/447 |
| 5,316,043 A | * | 5/1994 | Phillips | 137/625.23 |
| 5,660,078 A | * | 8/1997 | Phillips | 74/422 |
| 5,931,046 A | * | 8/1999 | Phillips | 74/422 |
| 6,119,540 A | * | 9/2000 | Phillips | 74/422 |
| 6,142,031 A | * | 11/2000 | Phillips | 74/422 |
| 6,247,375 B1 | * | 6/2001 | Gierc et al. | 74/388 PS |
| 6,591,706 B2 | * | 7/2003 | Harer et al. | 74/422 |
| 6,595,508 B2 | * | 7/2003 | Duncan | 269/242 |
| 6,619,420 B1 | * | 9/2003 | Saarinen | 180/428 |

FOREIGN PATENT DOCUMENTS

JP        11-321667 A        11/1999

* cited by examiner

Primary Examiner—Paul N. Dickson
Assistant Examiner—Toan C To
(74) Attorney, Agent, or Firm—Foley & Lardner LLP

(57) ABSTRACT

In a rack and pinion type steering apparatus whose housing includes a pinion accommodating portion, a rack accommodating portion, a radial opening defining a rack guide hole, and a projecting portion which is formed on the side of the rack accommodating portion opposite the rack guide hole. The radial opening is covered by a plug that is fixed by swaging. The projecting portion has a contact surface being received on a jig when the plug is fixed to the housing by swaging. Therefore, the reaction of the swaging from the jig does not directly affect the pinion accommodating portion.

20 Claims, 3 Drawing Sheets

RACK AND PINION STEERING APPARATUS AND METHOD FOR PRODUCING THE SAME

BACKGROUND OF THE INVENTION

1. Field of the Invention

This invention relates to a rack and pinion type steering apparatus, in particular to a rack and pinion type steering apparatus having a rack guide supporting a rack bar, and a method for producing the same.

2. Description of the Related Art

A known rack and pinion type steering apparatus used in turning steerable wheels (such as in a vehicle) includes a pinion which is disposed within a housing and which is operatively coupled with a vehicle steering wheel. A transversely extending rack is disposed in the housing in a meshed engagement with the pinion. Rotating the pinion produces a linear movement of the rack, which in turn causes the steerable wheels to turn. In the known rack and pinion type steering apparatus, a rack guide presses the rack into engagement with the pinion. A spring in a rack guide hole defined in the housing ensures that teeth on the rack firmly mesh with teeth on the pinion.

The rack guide and the spring are typically secured in the rack guide hole by a plug which screws into the housing over an outboard end of the rack guide.

The known rack and pinion type steering apparatus is disclosed in, for example, Japan Patent Publication (koukai) No. Heisei 11-321667 (incorporated herein by reference). According to that publication, the plug is fixed to the housing whereby a peripheral edge of the rack guide hole is swaged. This prevents the plug from coming out from the rack guide hole.

When the housing and the plug are being swaged together, a force is applied against the peripheral edge of the rack guide hole to press it in the direction that the rack guide presses the rack bar into engagement with the pinion.

At this time, the apparatus is placed on a work bench, and a pinion accommodating portion of the housing presses against a wall of the workbench. Specifically, the pinion accommodating portion is defined on the side of the rack bar opposite to the rack guide hole. The pinion accommodating portion is typically integrally formed with the housing, and outwardly projects with a semicircle shape. This semicircle-shaped pinion accommodating portion rests against the flat workbench in an unstable manner. Thus, the swaging has a high likelihood of being done inaccurately. Also, the pinion accommodating portion may be deformed by a force of the swaging.

SUMMARY OF THE INVENTION

According to an embodiment of the present invention a method for producing a rack and pinion type steering apparatus is provided. The method of producing a rack and pinion type steering apparatus comprising providing a pinion, providing a rack bar, providing a housing comprising a rack accommodating portion for accommodating the rack bar, the rack accommodating portion having a first side and a second side, the first side being substantially opposite to the second side of the rack accommodating portion, a radial opening on the first side of the rack accommodating portion, the radial opening defining a rack guide hole, a pinion accommodating portion on the second side of the rack accommodating portion, the pinion accommodating portion accommodating the pinion, and a projecting portion positioned on the second side of the rack accommodating portion, positioning the pinion in the pinion accommodating portion, positioning the rack bar in the rack accommodating portion, positioning a rack guide in the rack guide hole, wherein the rack guide supports the rack bar, positioning an elastic member in the rack guide hole, positioning a plug on the rack guide hole, the elastic member being positioned between the rack guide and the plug to press the rack guide toward the rack bar, and swaging the plug to the housing, wherein the step of swaging includes positioning the housing on an assembly support structure in a manner that the projecting portion contacts the assembly support structure.

According to another aspect of the present invention, an improved rack and pinion type steering apparatus is provided. The rack and pinion type steering apparatus comprising, a pinion, a rack bar operatively connected to the pinion, a housing comprising, a rack accommodating portion accommodating the rack bar, the rack accommodating portion having a first side and a second side, the first side being substantially opposite to the second side of the rack accommodating portion, a radial opening on the first side of the rack accommodating portion, the radial opening defining a rack guide hole, a pinion accommodating portion on the second side of the rack accommodating portion, the pinion accommodating portion accommodating the pinion, and a projecting portion positioned on the second side of the rack accommodating portion, a rack guide positioned in the rack guide hole, wherein the rack guide supporting the rack bar, a plug covering the rack guide hole, and an elastic member positioned between the rack guide and the plug, wherein the elastic member pressing the rack guide toward the rack bar, wherein the projecting portion is configured to operatively contact an assembly support structure when the plug is being fixedly attached to the housing.

Therefore, when swaging the housing and the plug together, the housing sits in a stable fashion on the workbench. The reaction of the swaging does not directly affect the pinion accommodating portion. Thus, the pinion accommodating portion is not strained or deformed by the swaging.

These and other features, aspects and advantages of the present invention will become apparent from the following description, appended claims, and the accompanying exemplary embodiments shown in the drawings, which are briefly described below.

DETAILED DESCRIPTION

Figure 1:
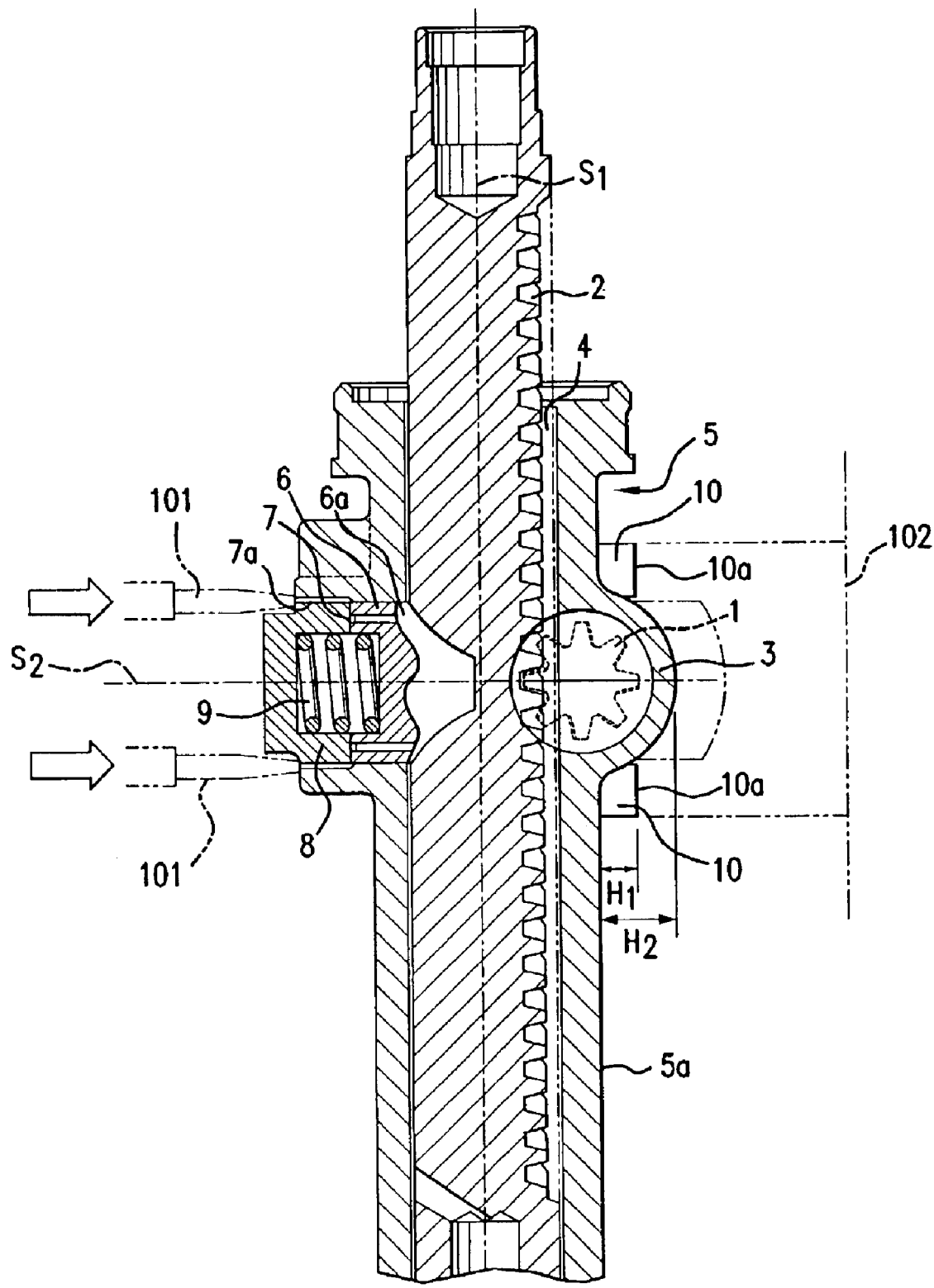
FIG. 1 is an enlarged cross sectional view of a rack and pinion type steering apparatus of an embodiment of the present invention.

A rack and pinion type steering apparatus according to preferred embodiments will now be described with reference to the drawings. FIG. 1 is an enlarged cross sectional view of a rack and pinion type power steering apparatus (the power steering) of an embodiment of the present invention.

As shown in FIG. 1, a housing 5 comprises a pinion accommodating portion 3 that houses a pinion 1, a rack accommodating portion 4 accommodating a rack bar 2, and a rack guide hole 7 which defined on the side of the rack bar 2 opposite to the pinion accommodating portion 3. The pinion 1 is operatively coupled to a steering wheel (not shown) and is accommodated in the pinion accommodating portion 3. The rack bar 2 meshes with the pinion 1 and is accommodated in the rack accommodating portion 4. A rack guide 6 is disposed in the rack guide hole 7 and can slide in the rack guide hole 7 to press the rack bar into firm engagement with the pinion 1. A plug 8 covers the rack guide hole 7 and is fixed to the housing 5. An elastic member, such as coil spring 9, is disposed between the rack guide 6 and the plug 8 to bias the rack guide 6 to engage with the pinion 1.

The pinion 1 is rotatable in the pinion accommodating portion 3. The rack bar 2 is slidable in the rack bar accommodating portion 4 in an axial direction of an axis S1. The rack guide hole 7 is defined along a direction of an axis S2, axis S2 being approximately perpendicular to axis S1.

The rack guide 6 can slide in the rack guide hole 7 in the direction of the axis S2. A sheet 6a is provided on a portion of the rack guide 6 where the rack guide 6 contacts with the rack bar 2. The sheet 6a improves contact between the rack guide 6 and the rack bar 2. The sheet 6a is used depending on the application, and may be excluded as appropriate for a particular application.

The coil spring 9 is disposed under a predetermined load between the rack guide 6 and the plug 8. The coil spring biases the rack bar 2 toward the pinion 1 via the rack guide 6.

The plug 8 screws into a screw hole 7a defining an inside peripheral edge of the rack guide hole 7. The axial position of the plug 8 is adjusted by screwing the plug 8 into the screw hole 7a. As shown in FIG. 1, the plug 8 is fixed to the housing 5 by swaging after adjusting the axial position of the plug 8. A swaging tool 101 is shown by dotted line in FIG. 1. The apparatus rests against an assembly support structure, such as a jig 102, during swaging. The swaging fixes the plug 8 to the housing 5 by swaging the peripheral edge of the rack guide hole 7. A part of the peripheral edge of the rack guide hole 7 subject to the swaging projects toward inside of the rack guide hole 7.

The housing 5 has a pair of projecting portions 10,10 on both axial sides of the pinion accommodating portion 3 along the pinion 1. Each of the projecting portions has a contact surface 10a. The contact surface 10a contacts the jig 102 when the housing 5 is being swaged.

Figure 2:
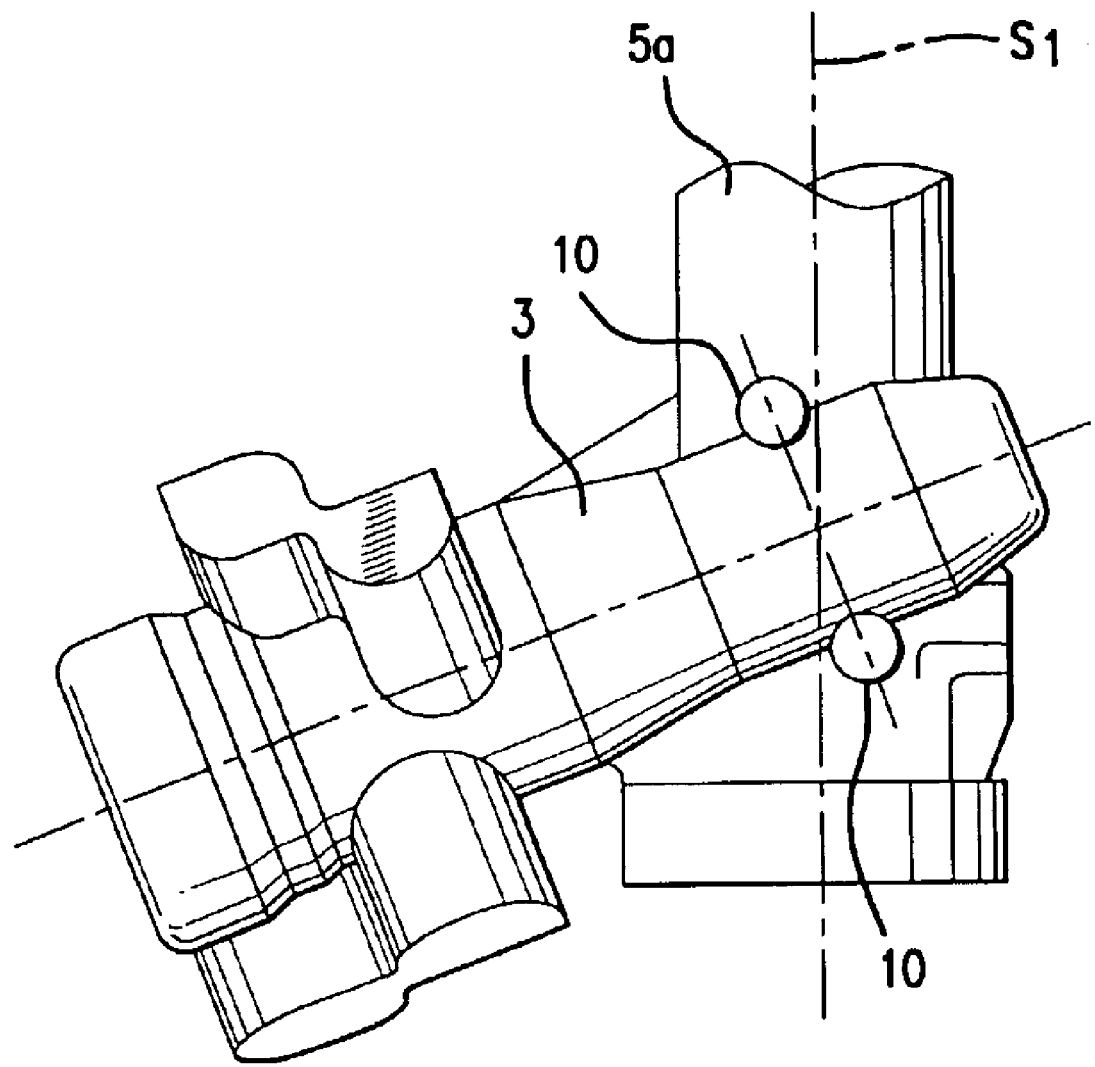
FIG. 2 is an enlarged front view of a rack and pinion type steering apparatus of an embodiment of the present invention.

As shown in FIG. 2, both the projecting portions 10,10 are displaced on the housing 5 so that they are offset from the axis S1. That is, the axis S1 is sandwiched between the projecting portions 10,10.

Figure 3:
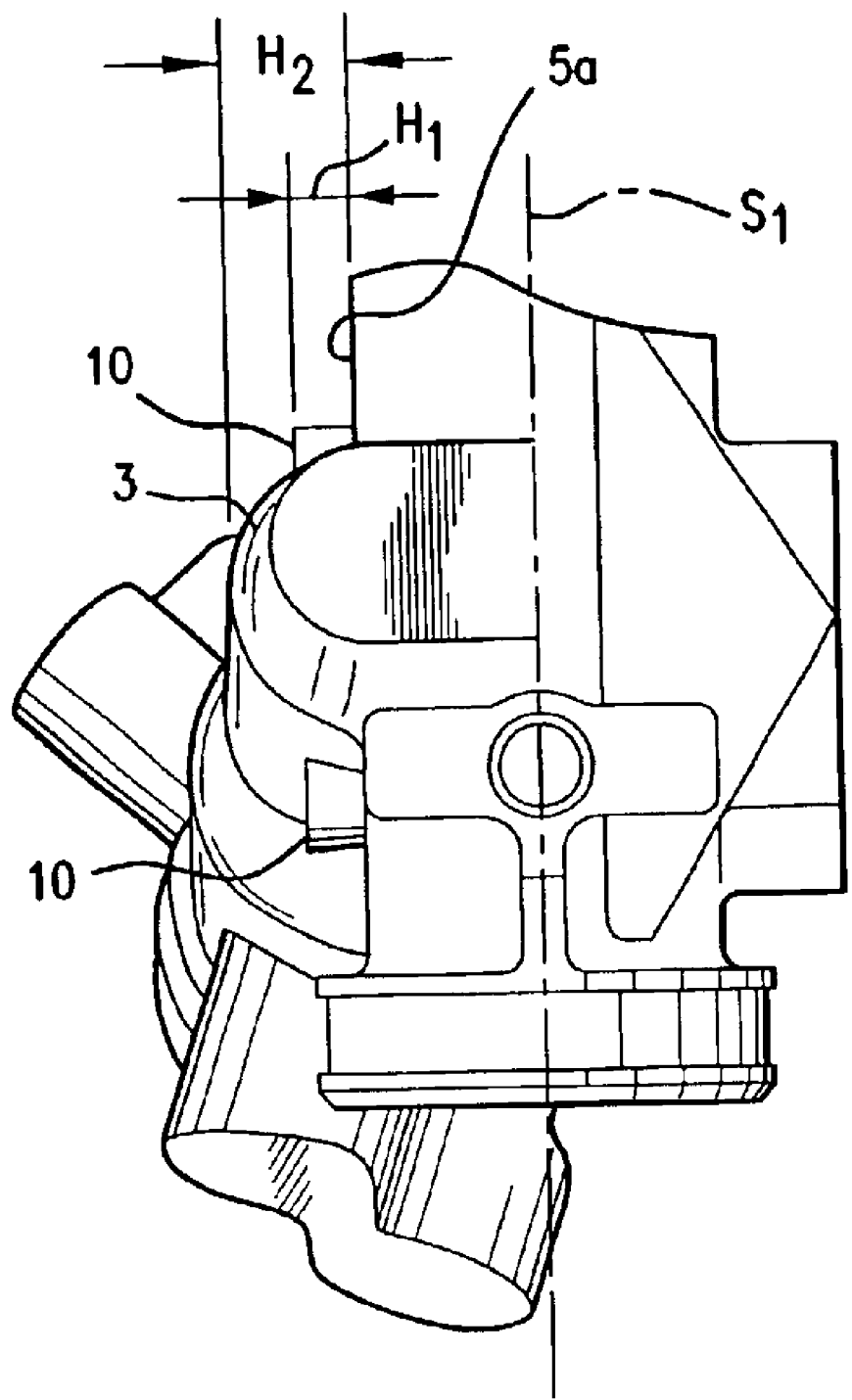
FIG. 3 is an enlarged bottom view of a rack and pinion type steering apparatus of an embodiment of the present invention.

As shown in FIGS. 1 and 3, a height H1 represents the amount that the projecting portion 10 extends from an outer surface 5a of the housing 5. A height H2 represents the amount the pinion accommodating portion 3 extends from the outer surface 5a of the housing 5. Height H1 is less than height H2.

The rack and pinion type steering apparatus of this embodiment is comprised as described above, the projecting portion 10 is provided on both sides of the pinion accommodating portion 3. As shown in FIG. 1, when the plug 8 is fixed to the rack guide hole 7 by swaging, the contact surface 10a contacts the jig 102. This stabilizes the housing 5 on the workbench. Also, the reaction of the swaging from the jig 102 does not directly affect the pinion accommodating portion 3. This prevents the pinion accommodating portion 3 from straining or deforming caused by the reaction of the swaging.

Also, the projecting portion 10 is formed adjoining the pinion accommodating portion 3. Therefore, the projecting portion 10 effectively receives a thrust load of the swaging, to thereby reduce any force placed on the pinion accommodating portion 3. In addition, this provides greater rigidity in the housing 5 between the pinion accommodating portion 3 and the rack accommodating portion 4.

Also, the projecting portion 10 is provided on both sides of the pinion accommodating portion 3 relative to the axis of the pinion 1, each having the contact surface 10a of the projecting portion 10 received on the jig 102. Therefore, the housing is disposed on the workbench with relatively greater stability compared to providing a single contact surface 10a on one side of the pinion accommodating portion 3. The present invention includes providing a single projecting portion with contact surface 10a on one side of the pinion accommodating portion 3.

The two portions of the projecting portion 10 are relatively offset in opposite directions from the axis of the rack bar. This provides stability to the housing 5 in direction of rotation with regard to the axis S1 of the rack bar 2. The two portions of the projecting portion 10 may alternatively be aligned along axis S1 of the rack bar 2 or be offset on the same side of the axis S1.

Also, the projecting portion 10 is integrally molded with the housing 5, which reduces the number of components. The projecting portion 10 may alternatively be joined to the housing 5 after separately molding the housing 5 and the projecting portion 10.

In addition, the housing 5 and the plug 8 are joined by swaging where the peripheral edge of the rack guide hole 7 is swaged. The housing 5 and the plug 8 may be joined by swaging where an outer peripheral portion of the plug 8 is swaged. Also, the swaged portion of the plug 8 and/or the rack guide hole 7 corresponds in a plan view to the projecting portion 10. Therefore, the projecting portion 10 effectively receives a thrust load of the swaging.

The projecting height H1 of the projecting portion 10 from the outer surface 5a of the housing 5 (the rack accommodating portion 4) is less than the projecting height H2 of the pinion accommodating portion 3 from the outer surface 5a of the housing 5 (the rack accommodating portion 4). This permits a size and weight reduction of the projecting portion 10.

The contact surface 10a has a flat surface. In addition, the two portions of the projecting portion 10 have contact surfaces 10a, 10a at a same distance from the axis of the rack bar, which stabilizes the housing 5 on the workbench.

Further, the jig 102 shown in FIG. 1 has a U-shape. Therefore, the jig 102 contacts both of the contact surfaces 10a, 10a of the projecting portion 10, but does not contact the pinion accommodating portion 3. However, the jig 102 may independently has two portions which receives each contact surface 10a. Also, the elastic member 9 is depicted as a coil spring 9, but any other material, such as rubber, may be adopted as the elastic member to provide the bias force.

Alternative shapes of the contact surface 10a and the jig 102 are envisioned, such as corresponding angular surfaces (such as with each contact surface 10a being at an opposite angle) between the contact surface 10a and the jig 102. In addition, the jig 102 may have an alternative design other than a U-shape that contacts with the contact surfaces 10a, but does not contact the pinion accommodating portion 3 itself. The jig 102 may contact the contact surfaces 10a in part, or along the entire contact surface 10a. Further, the shape of the jig 102 may be changed if the pinion accommodating portion 3 is different than a semicircular shape.

This application relates to and incorporates herein by reference in its entirety Japanese Patent application No. 2001-385659, filed on Dec. 19, 2001, from which priority is claimed.

It is to be understood that both the foregoing description is exemplary and explanatory only, and does not restrict the invention as claimed below. Moreover, different features of different alternatives may be combined.

What is claimed is:

1. A method of producing a rack and pinion steering apparatus, comprising:
   providing a pinion;
   providing a rack bar;
   providing a housing comprising:
   a rack accommodating portion for accommodating the rack bar, the rack accommodating portion having a first side and a second side, the first side being substantially opposite to the second side of the rack accommodating portion,
   a radial opening on the first side of the rack accommodating portion, the radial opening defining a rack guide hole,
   a pinion accommodating portion on the second side of the rack accommodating portion, the pinion accommodating portion accommodating the pinion, and
   a projecting portion positioned on the second side of the rack accommodating portion, the projecting portion having a flat surface;
   positioning the pinion in the pinion accommodating portion;
   positioning the rack bar in the rack accommodating portion;
   positioning a rack guide in the rack guide hole, wherein the rack guide supports the rack bar;
   positioning an elastic member in the rack guide hole;
   positioning a plug on the rack guide hole, the elastic member being positioned between the rack guide and the plug to press the rack guide toward the rack bar; and
   swaging the plug to the housing, wherein the step of swaging includes positioning the housing on an assembly support structure in a manner that the flat surface of the projecting portion contacts the assembly support structure.

2. The method of claim 1, wherein the projecting portion is adjoined to the pinion accommodating portion.

3. The method of claim 1, comprising providing a plurality of projecting portions, wherein at least one projecting portion is positioned on each side of the pinion accommodating portion in a direction of an axis of the rack bar.

4. The method of claim 3, wherein at least two projecting portions are positioned laterally offset relative to an axis of the rack bar.

5. The method of claim 4, wherein the at least two projecting portions are positioned on opposite sides relative to the axis of the rack bar, and
   wherein the at least two projecting portions are cylindrical posts.

6. The method of claim 3, wherein the flat surfaces of the projecting portions are provided at a same distance from the axis of the rack bar.

7. The method of claim 1, wherein the step of swaging the plug to the housing comprises swaging at least one of the plug and the housing at a position corresponding to the projecting portion along a radial axis transverse to an axis of the rack bar.

8. The method of claim 1, wherein the assembly support structure comprises receiving portions and a cavity, and wherein the step of swaging the plug to the housing comprises contacting the projecting portions to receiving portions of the assembly support structure, while retaining the pinion accommodating portion in the cavity of the assembly support structure.

9. A rack and pinion steering apparatus comprising:
   a pinion;
   a rack bar operatively connected to the pinion;
   a housing comprising a rack accommodating portion accommodating the rack bar, the rack accommodating portion having a first side and a second side, the first side being substantially opposite to the second side of the rack accommodating portion, a radial opening on the first side of the rack accommodating portion, the radial opening defining a rack guide hole, a pinion accommodating portion on the second side of the rack accommodating portion, the pinion accommodating portion accommodating the pinion, and a projecting portion positioned on the second side of the rack accommodating portion, the projecting portion having a flat surface; a rack guide positioned in the rack guide hole, wherein the rack guide supports the rack bar; a plug covering the rack guide hole; and an elastic member positioned between the rack guide and the plug, wherein the elastic member presses the rack guide toward the rack bar, wherein the flat surface of the projecting portion operatively contacts an assembly support structure when the plug is being fixedly attached to the housing.

10. The rack and pinion steering apparatus according to claim 9, wherein the projecting portion is adjoined to the pinion accommodating portion.

11. The rack and pinion steering apparatus according to claim 10, comprising a plurality of projecting portions, wherein at least one projecting portion is positioned on each side of the pinion accommodating portion in a direction of an axis of the rack bar.

12. The rack and pinion steering apparatus according to claim 11, wherein at least two projecting portions are positioned laterally offset relative to an axis of the rack bar.

13. The rack and pinion steering apparatus according to claim 12, wherein the at least two projecting portions are positioned on opposite sides relative to the axis of the rack bar.

14. The rack and pinion steering apparatus according to claim 11, wherein the flat surfaces of the projecting portions are provided at a same distance from the axis of the rack bar.

15. The rack and pinion steering apparatus according to claim 9, wherein the projecting portion is integrally formed with the housing.

16. The rack and pinion steering apparatus according to claim 9, wherein at least one of the plug and the housing have a swaged portion, the swaged portion and the projecting portion corresponding each other along a radial axis transverse to an axis of the rack bar.

17. The rack and pinion steering apparatus according to claim 9, wherein a first projecting height of the projecting portion from the rack accommodating portion is less than a second projecting height of the pinion accommodating portion from the rack accommodating portion.

18. The rack and pinion steering apparatus according to claim 9, wherein the plug is swaged to the housing.

19. The rack and pinion steering apparatus according to claim 9, wherein the assembly support structure is a jig.

20. The rack and pinion steering apparatus according to claim 9, wherein the projecting portion is a post extending from the rack accommodating portion.

* * * * *